Nov. 15, 1960          J. J. CAUBET          2,959,895
STRUCTURE FOR PLACING IN CONTACT SLOW MOVING
MEMBERS SUPPORTING HEAVY LOADS
Filed May 6, 1957                         3 Sheets-Sheet 3

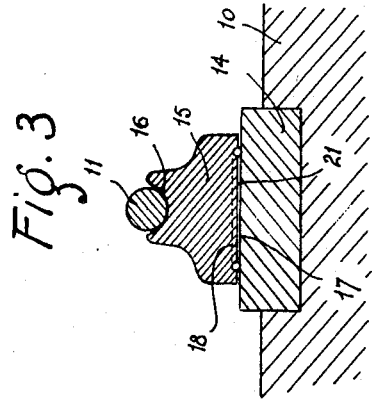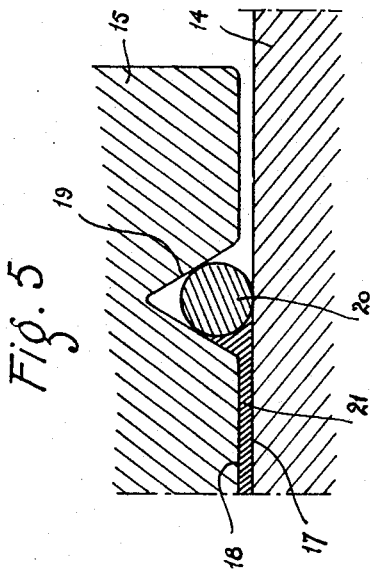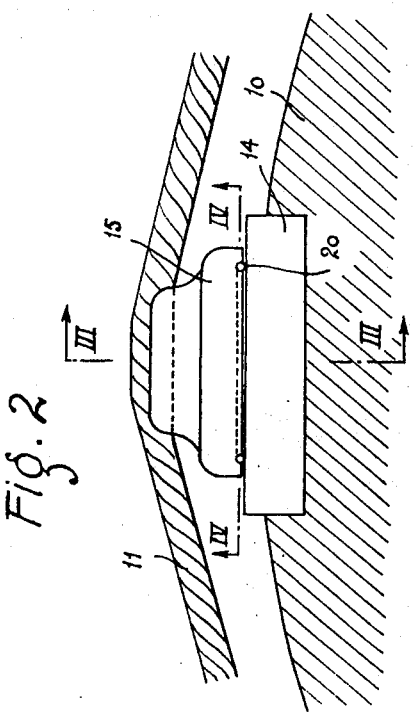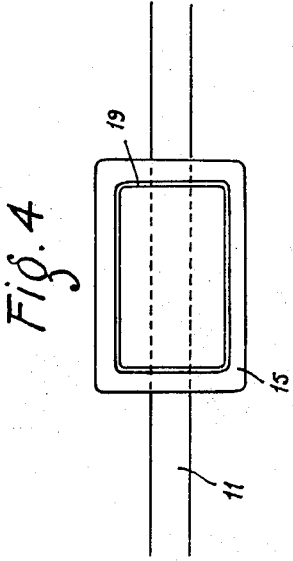

INVENTOR
JACQUES JEAN CAUBET
BY Irvin S. Thompson
ATTY.

United States Patent Office 2,959,895
Patented Nov. 15, 1960

2,959,895

STRUCTURE FOR PLACING IN CONTACT SLOW MOVING MEMBERS SUPPORTING HEAVY LOADS

Jacques Jean Caubet, Saint-Chamond, France, assignor to Societe dite: Ateliers Partiot Cementation, Rueil-Malmaison (Seine-et-Oise), France, a corporation of the French Republic Filed May 6, 1957, Ser. No. 657,131

Claims priority, application France May 5, 1956

8 Claims. (Cl. 50—129)

The present invention has for its object the reduction of friction between the contact of members intended to move slowly under heavy loads.

In very many industrial applications, such as in particular the pre-stressing of metal work or concrete, it is necessary to provide metallic members which are given a very slow movement while being subjected to heavy loads. During such movement, extremely high frictional stresses are generally produced.

This friction absorbs a substantial part of the tractive force employed on the members in relative movement. In the case of pre-stressing for example, a part of the force required for the pre-stress is thus lost and in consequence, a greater amount of energy must be expended.

In addition, it happens that because of the friction, seizures are produced by adhesion together of the metallic surfaces (the effect known as micro-welding). Sometimes even, by reason of excessive local loads exceeding the capabilities of resistance of the metal, metallic particles are torn out and this accentuates the seizure and has harmful effects.

These conditions are sometimes remedied by providing injections of lubricant between the surfaces in contact. In order that they may be reasonably effective, these injections must be continuous. Their application is generally difficult and they involve a substantial expenditure of energy. Furthermore, they are inoperative in the position of rest.

The present invention has for its object to avoid these drawbacks by considerably reducing the friction between the parts in contact.

It consists in utilizing as elements in contact, treated metallic surfaces, with an intermediate packing of a consistent lubricant retained by at least one fluid-tight lining.

As treated surfaces, it is an advantage to provide metallic surfaces, especially of cast-iron, which have been given a surface treatment with sulphur, which treatment is known as "sulphinuzation."

By means of this "sulphinuzation" treatment, the metal surfaces have improved properties. They can be put into contact with a substantial reduction of friction and the elimination of seizure by adhesion of the surfaces one to the other.

By retaining the lubricant in position by the fluid-tight lining, which is preferably elastic, the friction is reduced and this effect is obtained at all times, even when at rest.

Experience has shown that with the means indicated above, the coefficient of friction, metal to metal, which is usually of the order of 10 to 15%, is reduced to values of the order of 2%, which is practically negligible.

The method in accordance with the invention may be employed for surfaces of various forms. It is of particular advantage in the case of flat members sliding one on the other. It is however also utilizable for members of cylindrical or other shapes.

This method finds a use in the application of pre-stressed constructions of reinforced concrete. It is also applicable to all cases in which a force must be applied under a heavy load, with a slow speed of movement of the members in contact, as in the case of hooping.

The accompanying drawings show by way of example a form of application of the invention in the case of the use of pre-stress of a circular construction in reinforced concrete.

Fig. 2 is a view in elevation of a frictional contact member.

Fig. 3 is a view in cross-section taken along the line III—III of Fig. 2.

Fig. 4 is a plan view from below, along the line IV—IV of Fig. 2.

Fig. 5 is a cross-section, to a larger scale, of the detail of the groove with its elastic joint which retains the lubricant.

Figure 1:
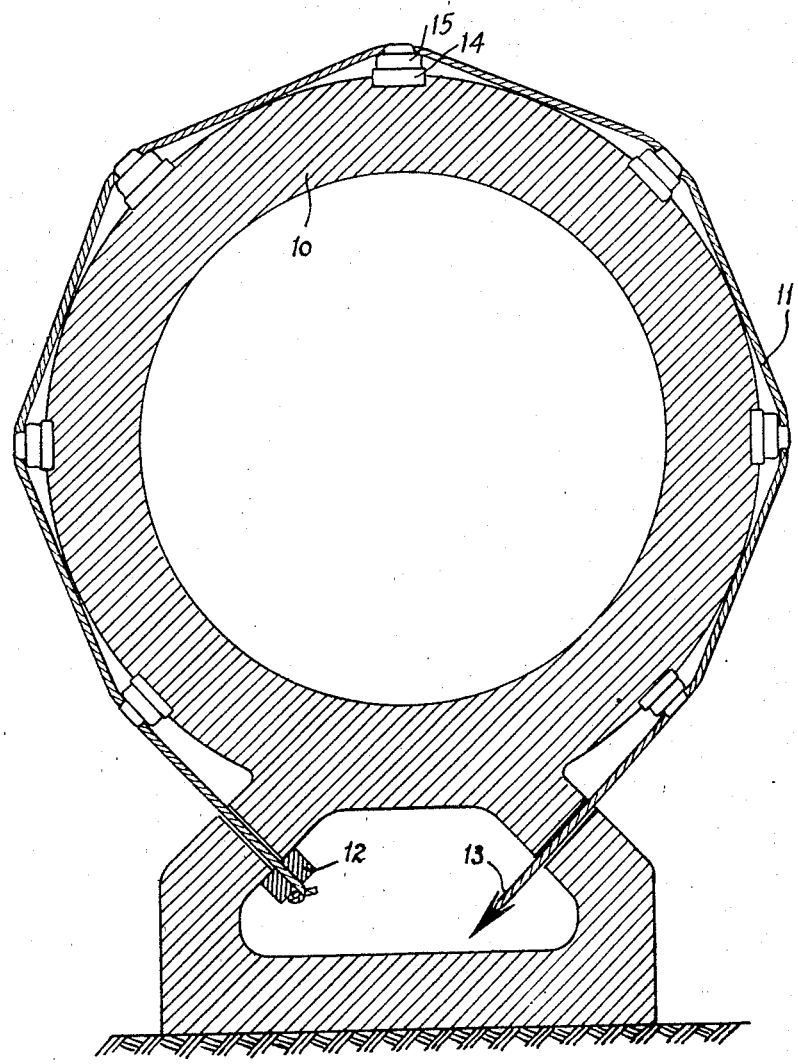
Fig. 1 is a view in transverse cross-section of the construction together with its pre-stressing members.

As shown in Fig. 1, the invention is supposed to be applied to a circular work 10 of reinforced concrete. This work is put under pre-stress by means of a cable, fixed to a point of attachment 12, the desired tension being applied at 13 by any appropriate means, such as a jack or the like (not shown).

The cable 11 is applied to the work 10 by sliding contacts with flat faces. Each of these contacts is composed, as shown in Figs. 2 to 4, of a fixed shoe 14 embedded in the concrete, on which is applied a moving shoe 15 which carries at 16 a groove in which the cable 11 passes. The shoes 14 and 15 are in contact by the flat surfaces 17 and 18.

The shoes 14 and 15, or at least their surfaces 17 and 18, are of metal or alloy of suitable characteristics to withstand without difficulty the heaviest possible overloads. The metal or alloy is chosen so as to receive a treatment of "sulphinuzation" on the surfaces in contact. To this end, use is made more particularly of cast-iron with spheroidal graphite having a pearlitic or bainitic structure. The contact surfaces are sulphinuzated after machining.

One of the surfaces, the surface 18 in the case of the figures, is provided with a groove 19, in which is arranged a joint 20. The groove 19 may be of triangular, rectangular or other cross-section. The joint 20 is of fluid-tight sealing material, copper or lead wire, or preferably of elastic material such as synthetic rubber.

It will be understood that the joint 20 arranged in the groove 19 forms a space 21 between the surfaces 17 and 18. This space is filled with a lubricant.

The lubricant filling the space 21 is chosen so that it can withstand high pressures, that it has a low coefficient and that it has not any tendency to flow in the case of breaking or cracking of the joint.

For this purpose, a composition with a base of bisulphide of molybdenum is especially advantageous. Bisulphide of molybdenum alone would be suitable as a lubricant, and in practice it is used in a mixture with thick grease, the mixture containing a very high proportion of bisulphide and only a little grease proper. A small quantity of colloidal graphite may be added to make the mixture compact.

In fact, the composition is chosen so as to have a viscosity which is as low as possible, in the same way as wet sand, which can withstand very high pressures without running out. With respect to the bisulphide of molybdenum, the grease plays the same part as the water with the sand, enabling the former to be workable and to have a certain consistency.

With the arrangement described, when tension is applied to the cable 11, the shoes 15 are compressed against the fixed shoes 14. Under the effect of this compression, the joint 20 is reduced in thickness and the lubricant in the space 21 is also compressed. The compressed joint 20 prevents the escape of the lubricant and this is retained in contact with the surfaces 17 and 18.

Under the load due to the tension of the cable, the pressure applied at the surfaces 17 and 18 may attain 200 to 400 kgs. per sq. cm. Under this pressure, the surfaces can make without difficulty the relative movement necessary for placing the cable 11 in position, the coefficient of friction being very low, less than 2%, and offering no resistance which is likely to affect the satisfactory condition of the contact surfaces 17 and 18.

Figure 7:
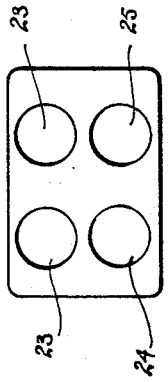
Figs. 6 to 8 are diagrammatic views from below of alternative forms of construction with multiple joints.
Figure 6:
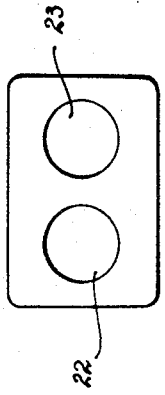
Figure 8:
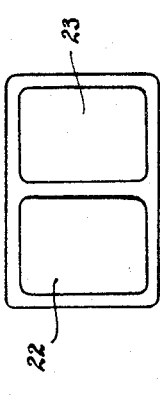

Instead of a single joint as shown in Figs. 2 to 5, it is often preferable to provide two or four joints, as shown in Figs. 6 to 8.

If, in fact, there occurs a break or a cracking of a joint, resulting in the expulsion of the lubricant, due to the effect of the high pressure applied, the metallic surfaces come into contact, and if the unit pressure of metal to metal exceeds a certain value, this may result in a mechanical destruction of the surfaces, causing tearing of the metal. The sulphinuzated which prevents seizure by adhesion of microwelding may not be able to prevent mechanical destruction of this kind.

By forming the multiple joints 22, 23, 24 and 25, which may be circular, rectangular or other forms, the risks inherent in a single joint are overcome.

Figure 9:
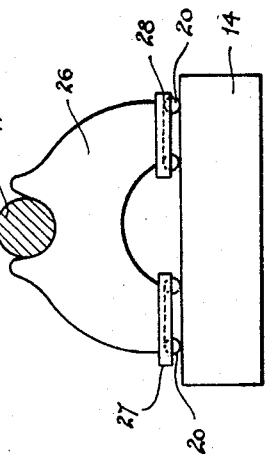
Fig. 9 is a view in cross-section of an alternative form of the embodiment shown in Fig. 3.

In accordance with a further embodiment shown in Fig. 9, the upper moving surface which receives the cable 11 is in the form of a saddle 26 which may be of ordinary metal with two elements 27 and 28 of treated metal, applied on the fixed shoe 14 by two or four joints 20 of the type previously described.

In this form of embodiment, as in those previously described, conduits (not shown) may be provided, having their openings in the space 21, defined by the joint 20, enabling lubricant under high pressure to be supplied to the said space 21. By this means, in case of cracking of the joint 20, it is possible to replace the lubricant which escapes through the crack at the rate at which it is being lost.

The extremely high consistency of the grease operates in a favourable manner by reducing the flow of the lubricant through the cracks, whilst enabling the molecules of grease which are further away from the crack to continue to carry a large proportion of the load.

The multiplicity of the joints enables the parallelism of the moving surface with respect to the fixed surface to be approximately maintained, even in the case of rupture of a joint, by virtue of the injection which is made in the interior of the defective joint.

It will of course be understood that the arrangements described and shown have no restrictive character and may comprise all alternative forms of construction without thereby departing from the scope of the invention. In the same way, the invention is in no way limited to the application described and shown and may be employed for all other applications, with a corresponding adaptation of the devices employed.

What we claim is:

1. In apparatus for stressing a structure by means of a flexible tensile member having a first part at an angle to a second part, which member is placed under tension to thereby stress the structure and which member causes a force directed inwardly toward said structure when so tensioned; a device for facilitating the generally axial movement of said member relative to the structure comprising a first shoe supported by the structure and having a generally planar face directed toward said member, a second shoe supporting said member and having a generally planar surface facing the planar surface of said first shoe, said surfaces being substantially continuous and at least one of said surfaces being provided with a continuous closed groove, a packing of viscous lubricant within the boundaries of said groove, and a sealing member in said groove and engaging the surface of said other shoe and retaining said sealing member within the boundaries of said groove.

2. The combination of claim 1, said lubricant being formed of a thick grease and molybdenum bisulphide.

3. The combination of claim 1, said structure comprising a set concrete mass.

4. The combination of claim 1, said sealing member being a continuous elastic ring.

5. A device for transmitting the effort of a tension cable to a concrete construction which is subjected to prestressing, with slow displacement under a heavy load, comprising a first shoe in contact with the concrete construction and provided externally with a flat surface, a second shoe supporting the cable and having on the side opposite to the cable a flat surface which is applied against the surface of the first shoe, a continuous groove formed in at least one of said flat surfaces, an elastic joint inserted in said groove, and a packing of lubricant composed of grease and molybdenum bisulphide placed in a space provided between the two flat surfaces and the elastic joint.

6. A device as claimed in claim 5, in which said shoes are of cast iron and said flat surfaces have been treated with sulphur.

7. A bearing assembly for transmitting the effort of a tension cable to a member which is subjected to inwardly directed forces with slow displacement under a heavy load, comprising a first shoe in contact with the member and provided externally with a flat surface, a second shoe supporting the cable and having on the side opposite to the cable a flat surface which is applied against the surface of the first shoe, a continuous groove formed in at least one of said flat surfaces, an elastic joint inserted in said groove, and a packing of lubricant composed of grease and molybdenum bisulphide placed in a space provided between the two flat surfaces and the elastic joint.

8. A bearing assembly as claimed in claim 7, in which said shoes are of cast iron and said flat surfaces have been treated with sulphur.

References Cited in the file of this patent

UNITED STATES PATENTS

| 519,906 | Harrison | May 15, 1894 |
| 2,185,749 | Kennedy | Jan. 2, 1940 |
| 2,266,377 | Neely et al. | Dec. 16, 1941 |
| 2,579,183 | Freyssinet | Dec. 18, 1951 |
| 2,609,342 | White et al. | Sept. 2, 1952 |
| 2,697,645 | Mitchell | Dec. 21, 1954 |

FOREIGN PATENTS

| 499,786 | Canada | of 1954 |
| 688,687 | Great Britain | of 1953 |

OTHER REFERENCES

Machine Design (a publication), June 1947 (pages 110–116).